Oct. 6, 1964    T. W. RUSSELL    3,151,481
LOAD-RESPONSIVE SYSTEM FOR MEASURING INSTRUMENTS
Filed Oct. 5, 1962

INVENTOR.
THOMAS W. RUSSELL
BY
ATTORNEYS

United States Patent Office 3,151,481
Patented Oct. 6, 1964

3,151,481
LOAD-RESPONSIVE SYSTEM FOR MEASURING INSTRUMENTS
Thomas W. Russell, 445 S. 41st St., Boulder, Colo.
Filed Oct. 5, 1962, Ser. No. 228,720
5 Claims. (Cl. 73—141)

The invention relates to improvements in load-responsive systems for measuring instruments of the general type forming the subject matter of U.S. Patent Number 3,058,342.

In the U.S. patent above-identified, a load-responsive system is disclosed wherein an indicator, usually a mirror, is suspended between two supports, at least one of which is movable under load, by two substantially identical pairs of quartz filaments that are pre-loaded both tensionally and torsionally. The filaments of each pair normally occupy a skewed relationship to one another. A force applied to move the supports closer together will lessen the tension on the filament pairs causing the pre-load torsional component therein to act in a direction to move each pair from skewed towards a crossed relationship. Conversely, a force applied in a direction to separate the supports increases the tension in the filaments resulting in their attempting to move from a skewed into a parallel relation while, at the same time, increasing the torsional load in each fiber. The non-linearity problems of the system were reduced to a practical minimum by arranging the points of attachments of each pair of filaments to its support in intersecting rather than parallel planes so that no filament could go slack, i.e. as one bifilar system moved toward parallel relation the other moved toward crossed relation.

It has now been determined that the above-described system has several deficiencies which render it somewhat unsatisfactory for extremely sensitive measurements although it has proven satisfactory for less sensitive applications. The major difficulty is the necessity for calibrating each load-responsive system separately and having to determine a number of points corresponding to different loads on each one. In other words, even though the indicator deflection is reasonably linear, it is by no means the same for different suspension systems and this involves laborious and time-consuming calibration procedures.

It seemed, therefore, that the aforementioned calibration difficulties could be overcome by eliminating one bifilar and substituting therefor a single torsion fiber. Conceivably, if this were done, the single torsion fiber could be employed to cancel out the deflection produced in the indicator as a result of the load and, once the null or index position of the indicator was again achieved, it would be a simple matter to determine the number of turns made in the torsion filament which could be read-out directly in terms of the load. It is significant, of course, that the single torsion fiber would produce a linear read-out for all practical purposes. In such a system only the null point corresponding to the unloaded condition of the system had to be located thus considerably simplifying the calibration.

This approach to the problem solved many of the calibration difficulties, however, other deficiencies soon appeared that were equally critical. These deficiencies took the form of appreciable errors in the readings which could not be tolerated in measuring instruments having the sensitivity for which the system was designed. Two factors were primarily responsible for these errors, both involving the torsion fiber. The first factor was that when the torsion fiber was twisted to cancel out the deflection in the indicator produced by the load in the remaining bifilar, the torsion filament also shortened up slightly inducing a further response in the bifilar and indicator that reacted exactly like a change in the load being sensed and which the system could not differentiate. In other words, an error of first order magnitude was translated into the system by twisting the torsion fiber producing a subtractive error which proved to be substantially impossible to compensate for or differentiate from the response induced by the load alone. The second factor was the infinitesimally small but, nevertheless, significant error introduced by the end play in the rotatable element attached to the torsion fiber by which the latter was twisted. It was found that no matter how precise the bearings and mount for such rotatable element were made, some end play still existed which would introduce first order errors in the readings in the same manner as above-described with regard to foreshortening of the torsion filament. Furthermore, these end-play errors were not reproduceable to any extent which could be relied upon in arriving at some compensating factor as they varied with the number of turns through which the torsion fiber was twisted, the viscosity of the bearing lubricant, the cleanliness of the system and similar conditions which could not be controlled with certainty.

It soon became apparent that the solution to these problems could not be found in the elimination of the conditions which were responsible for them as this could never be done practically even assuming all the conditions that, for example, would result in end-play could be determined with certainty. It has now been found in accordance with the teaching of the instant invention that rather than try to eliminate the error-producing condiions, the solution lay in another direction, namely, reduce their effect on the system from that of a first order magnitude to one of third or fourth order wherein they would have a negligible effect on the desired measurement. This has been accomplished by substantially altering the structure in a manner to more or less isolate that section of the torsion fiber responsible for the above-mentioned errors and also introducing a spring element into the torsion fiber which will maintain a substantially uniform tension therein irrespective of the end-play in the rotatable element and other error-producing factors.

It is, therefore, the principal object of the present invention to provide a novel and improved load-responsive system for use in various type of measuring instruments such as, for example, scales, gages, calipers, etc.

A second objective is the provision of a device of the character above-described that uses a null-point read-out that simplifies calibration.

Another object is to provide a load-responsive system incorporating a torsion filament having a critical portion thereof substantially isolated from the main load sensing elements so as to minimize the effect of end-play errors.

Still another objective of the invention herein set forth is to introduce a spring element into the torsion filament of a load-responsive bifilar suspension in a manner to reduce error-producing tensional components in a section of the torsion fiber to a negligible minimum.

An additional object is to produce a unique bifilar load-sensitive system having a reproduceable sensitivity far in excess of that heretofore considered possible with such arrangements.

Further objective are the provision of a system for detecting and measuring loads that is relatively simple to index, requires no calibration in the sense of locating several points corresponding to various known loads, is extremely compact and quite rugged, a unit that is versatile and readily adaptable to a wide variety of measuring applications, an apparatus that is easy to use and substantilly fool-proof even in the hands of a relatively unskilled operator, and a device of the class above mentioned that either eliminates altogether or at least materially lessens the problems ordinarily associated with such systems resulting in greatly increased accuracy and reliability.

Other objects will be in part apparent and in part pointed out specifically hereinafter in connection with the description of the drawings that follow, and in which.

Figure 1:
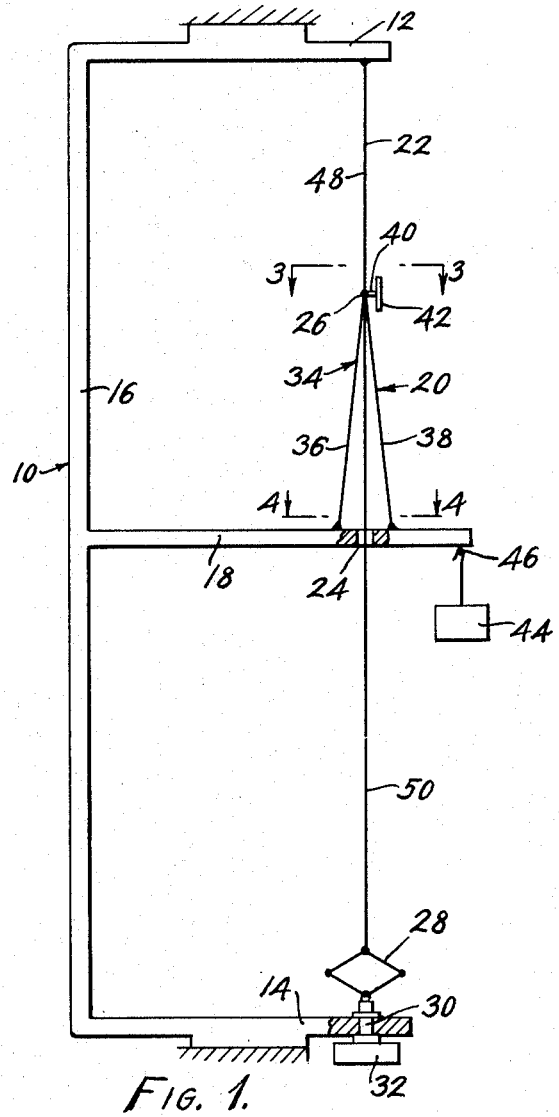
FIGURE 1 is a side elevation in a more or less schematic form, portions of which have been broken away and shown in section, revealing the basic elements of a load-responsive system in their functional relationship to one another, the supporting structure and the load.
Figure 2:
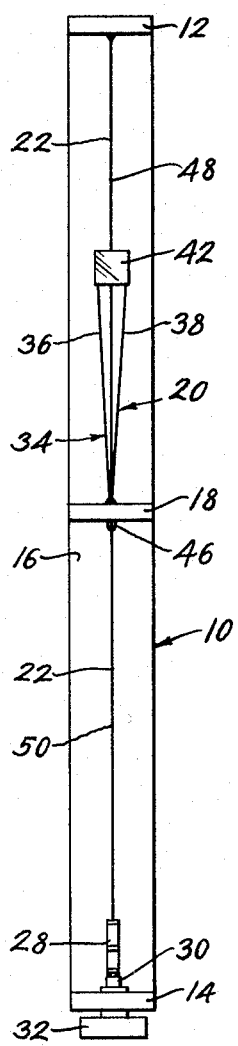
FIGURE 2 is a front elevation of the system.

Referring now to the drawings for a detailed description of the present invention and, initially, to FIGURES 1 and 2 for this purpose, reference numeral 10 represents broadly the entire supporting frame for the filament system. Included within this frame which has more or less of an E-shaped configuration as illustrated, is a fixed support 12 that for purposes of the present description can be considered immovable under the loads to which the system is subjected in use. On the other end of the frame is a support 14 which may be immovable to the same extent as support 12 and has been so indicated; however, as the description proceeds it will become apparent that support 14 need not be as rigidly mounted as support 12 to satisfy the requirements of the present system. These two supports 12 and 14 have been shown interconnected by a bridge element 16 of the frame for purposes of simplicity of illustration although, here again, these two supports can be entirely separate with no common connection therebetween as long as a substantially fixed spaced relationship therebetween is maintained. The remaining element of the frame is a movable support 18 located between supports 12 and 14. This movable support projects from the bridge 16 intermediate the extremities thereof and is preferably a part of the same frame that includes fixed support 12 as the load-sensing elements of the filament assembly must be stretched between these two supports and respond to relative movement therebetween.

The filament assembly of the apparatus has been designated in a general way by reference numeral 20 and includes a single torsion filament 22 extending between supports 12 and 14 through an opening 24 in support 18, a transverse bracket 26 attached to the torsion filament intermediate supports 12 and 18, spring means 28 connected to the lower extremity of the torsion filament providing a yieldable coupling between it and the stem 30 of rotatable element 32 that is journalled for rotation in support 14, and a bifilar 34, the filaments 36 and 38 of which are attached between movable support 18 and bracket 26. The bracket 26 is generally T-shaped as shown and includes a stem portion 40 on the free extremity of which is mounted an indicator 42. This indicator has been illustrated as a mirror although other types of indicators such as, for example, pointers would also suffice for the purpose. The mirror indicator makes it possible to employ an inertialess light beam which will not introduce errors into the filament system and can be integrated into a reflective-type readout system such as that shown in U.S. Patent 3,067,617 which is assigned to me and utilizes a splitting prism dividing the reflected beam through a balancing galvanometric circuit.

For purposes of illustration, a load 44 has been shown suspended from an eyelet 46 on the free end of movable support 18. It is to be understood, however, that this is intended as being merely representative of one of several different ways in which the spring between supports 12 and 18 can be changed in response to a load applied thereto, the magnitude of which is to be determined. Also, while it has not been illustrated, the load-responsive system herein disclosed will operate equally well to sense and measure loads applied to movable support 18 in a direction to lift same toward fixed support 12 and it is, therefore, by no means restricted to the determination of loads applied as shown which tend to spread these supports apart.

Figure 4:
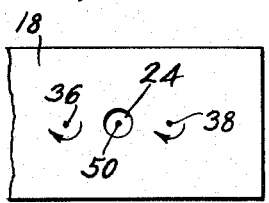
FIGURE 4 is a fragmentary section similar to FIGURE 3 except that it is taken lower down along line 4—4 of FIGURE 1.

Having identified the significant elements of the system, it will be advantageous to describe in detail how they interrelate functionally to produce the desired end result and reference will be made to all the figures of the drawing for this purpose. All elements of the system shown, with the exception of the load 44, eyelet 46, mirror 42 and perhaps rotatable element 32 are preferably fabricated from quartz which is recognized as a substance having little or no hysteresis provided the system is intended to have maximum sensitivity. The lower extremities of filaments 36 and 38 of the bifilar 34 are attached to the upper surface of movable support 18 on opposite sides of the opening 24 through which the torsion fiber passes. Next, both of these filaments are pre-loaded torsionally by twisting them in the same direction substantially the same amount such as, for example, in a clockwise direction as indicated by the arrows in FIGURE 4. Then, the upper free ends of these filaments 36 and 38 are attached to opposite ends of the cross-bar portion of T-shaped bracket 26. Thus, the pre-load torsional force component in the bifilar would tend to turn the bracket and associated indicator 42 counterclockwise as viewed in FIGURE 3 as these filaments attempt to unwind and move from the skewed relation shown into a crossed relation.

That portion 48 of torsion filament 22 extending between support 12 and the midpoint of the cross-bar of bracket 26 is most significant to the successful operation of the system and is replaces the second bifilar of the earlier unit shown in U.S. Patent No. 3,058,342 to which reference has already been made. The upper end of portion 48 of the torsion fiber 22 is dead-ended on fixed support 12 as shown. The lower end, on the other hand, is attached to the bracket 26 midway between the points of attachment of the bifilar 34; however, before this connection is made, this torsion fiber is pre-loaded tensionally by the amount required to counterbalance the pre-load torsional force component in the bifilar when the indicator is properly oriented in the desired "null" or "index" position. In other words, portion 48 of the torsion filament is tensioned to induce a pre-load tension in the bifilar adapted to maintain a null position thereof somewhere between a fully crossed and a coplanar relation, such null position for purposes of the instant description having been referred to as "skewed."

Figure 3:
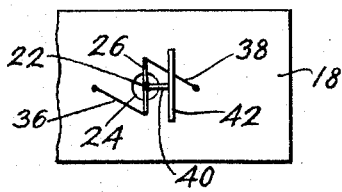
FIGURE 3 is a fragmentary section taken along line 3—3 of FIGURE 1 showing the bifilar and associated indicator.

Now, neglecting for the moment the lower section 50 of the torsion filament 22, the purpose and function of which will be described presently, it becomes apparent that when a load 44 is added to the movable support 18 of a magnitude to bend the latter downwardly increasing the space between supports 12 and 18, the tension in both filaments 36 and 38 of the bifilar and also in upper section 48 of the torsion filament will be increased by an increment due to the applied load which is over and above their pre-load tension. This additional tensional force component in the bifilar 34 will overbalance the pre-load torsion therein causing the filaments 36 and 38 to move in the direction of a coplanar relation while, at the same time, twisting these filaments to increase the torsion load therein until it once again counterbalances the sum of the tension components, i.e. the initial preload tension plus the tension induced by load 44. When this occurs, bracket 26 will turn clockwise as seen in FIGURE 3 turning the indicator 42 carried thereby away from its null position. In the case of a mirror indicator with a light beam impinging thereon, the beam would, of course, be reflected off at an angle to that at which it strikes the silvered surface.

Conversely, were the load 44 applied in a direction to raise the movable support and deflect it closer to fixed support 12, the tension in the bifilar and section 48 of the torsion filament 22 would be lessened by an amount caused by the "negative" load. With the tension thus relieved somewhat, the pre-load torsion in the bifilar overbalances the tension therein causing the filaments to unwind until the tensional and torsional loads therein are, once again, balanced. As this condition is realized, the bifilar will have moved from the skewed relation it occupies in null position toward a crossed relation causing the bracket and indicator to turn counterclockwise as viewed in FIGURE 3.

It has already been mentioned that one of the major shortcomings of the earlier system that had two bifilars was measuring this degree of angular deflection of the indicator as it entailed a laborious and time-consuming calibration procedure for each instrument. Accordingly, if it were possible to twist the torsion filament 22 in a direction opposite to that in which the indicator has moved until the latter returns to its null position, the twist or number of turns that had to be made in the torsion filament to achieve this condition could be related to the applied load and be read-out as a direct measurement thereof. Note, however, that if rotatable element 32 which is used to twist this torsion filament 22 were journalled in either fixed support 12 or movable support 18, any end-play in the shaft 30 caused by bearings, lubricant, eccentricity, tilt and the like would be reflected directly in the bifilar and said torsion filament to change the tension therein thus introducing an error and producing a false reading. To the same effect is the foreshortening of the torsion filament when it is twisted. Furthermore, these are errors of the first order in that they have the same effect on the filament system as the applied load does. Even this would be all right were it possible to determine with certainty what these errors were, their magnitude, etc.; however, this is not possible nor can the bifilar and torsion fiber differentiate between those tensional force components derived from the applied load and extraneous sources.

This difficulty has been eliminated or at least reduced to a negligible minimum in accordance with the teaching of the instant invention by more or less isolating that portion 50 of the torsion fiber into which the counter torsional force component necessary to null the indicator is directly induced. Thus, the lower portion 50 of the torsion fiber 22 is not connected to the movable support 18, but rather, passes through opening 24 therein and is attached to the shaft 30 of rotatable element 32 by means of a spring member 28, the latter elements being carried by a third support 14 positioned underneath the movable support. Spring element 28 is of the parallelogram or "lazy tong" type adapted to maintain a relatively constant tension in section 50 of the torsion filament 22; yet, at the same time, transmit torque thereto when rotatable element 32 is turned. It is extremely significant to note that the tension in the legs 48 and 50 of the torsion filament 22, i.e. the sections above and below bracket 26 are by no means equivalent to one another. Section 48 is under relatively high tension as it is responsible for the pre-load tension in the bifilar as well as any additional tention imparted thereto by the applied load. Also, the tension in section 48 is variable over a rather wide range; whereas, the tension in torsion filament section 50 is of a relatively low magnitude and remains substantially constant due to spring 28. Furthermore, the tension in section 50 is relatively unaffected by the applied load as spring 28 merely extends or contracts to compensate for any change in the distance separating bracket 26 and the stem or shaft 30 of rotatable element 32. The tensional increment induced in section 48 by section 50, in addition to being substantially constant, is always present in the system and, therefore, does not come about only when the torsion fiber is turned to null a deflection in the indicator under an applied load. For practical purposes, the maximum tension that can be produced in section 50 and transmitted through section 48 of the torsion fiber to fixed support 12 must remain below that which is detectable as a deflection of fixed support 12 and this requirement is, quite obviously, a simple one to achieve by merely making support 12 thick and rigid.

With section 48 of the torsion fiber stretched much tauter than section 50 it becomes self-evident that more torque must be applied to twist section 48 through the given angle than is required to turn section 50 through the same angle. Accordingly, several complete turns of section 50 may be required to produce a single 360° turn in section 48 as the restoring torque necessary to turn the indicator back to null position must be generated in section 50. In actual working units constructed in accordance with the teaching hereof, full-scale deflection of the indicator is limited to an angle of about 30° from the null position and approximately six full turns of section 50 are required to produce the countertorque necessary to return the indicator to null position when fully deflected. This means that any errors induced in the bifilar and section 48 of the torsion fiber by variation in the tension in section 50 due to shaft end-play, inconsistencies in the spring 28 at different degrees of flexion, etc., are reduced to approximately 1/70 of their real value insofar as they appear in the final measurement. For example, assume that the tension in section 50 of the bifilar varies as much as 0.005 gram between the fully-deflected position of the indicator and the null position thereof following application of the countertorque. Such an error, which, by the way, is many times greater than is actually present in a well-designed unit, would affect the final reading only about 0.07 milligram which is insignificant for most purposes. In actuality, the errors are so small as to be undetectable in the result.

It can now be seen that lower support 14 need only be rigid enough to not flex beyond the point where spring 28 fails to maintain relatively uniform tension in section 50 of the torsion fiber. As for spring 28, its maximum deflection lies in the neighborhood of a few thousandths of an inch and no particular problem exists in fabricating one that is capable of maintaining a constant tension in torsion fiber section 50 over this small range.

Finally, with regard to the rotatable element 32, no attempt has been made to illustrate the precision ball bearings and the like in which it is usually journalled for rotation within the opening provided therefor in support 14 although good engineering practice obviously requires such refinements. Instead, a simple bearingless journal has been shown which adequately illustrates the principle of a means for twisting the torsion fiber 22 in order to return the indicator to its null position. The read-out is, of course, derived from this rotatable element as the number of turns and fractions of a turn it must make in order to return the indicator to null position is a direct measure of the applied load. By connecting this rotatable element to a suitable counter of some type, direct readings can be derived requiring no interpretation or interpolation by the operator. More sophisticated automatic units have been made in which deflection of a light beam reflected off the mirror energizes a servo-mechanism geared to the rotatable element so as to apply the countertorque necessary to balance the load. Once the beam has again returned to its null position, the servo-mechanism is de-energized and the reading taken.

Having thus described the several useful and novel features of my improved load-responsive system, it will be apparent that the many worthwhile objectives for which it was designed have been achieved. Although but a single specific embodiment of the invention has been illustrated, and it only diagrammatically, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The load-responsive system for measuring instruments and the like which comprises, a fixed support adapted to remain substantially immovable under the maximum applied load the system is intended to measure, a second support spaced from the fixed support, rotatable means journalled within the second support, a single torsion filament stretched taut between the fixed support and the rotatable means carried by the second support, a movable support located between the fixed and second supports independent of the torsion filament, said movable support being adapted to flex under the influence of applied loads in a direction to vary the distance separating it from the fixed support, a transverse bracket attached to the torsion filament for movement therewith between the fixed and movable supports, a bifilar connected between said bracket and movable support structurally independent of the torsion filament, said bifilar including a pair of filaments fastened at spaced points on opposite sides of the torsion filament, the filaments of said bifilar each being pre-loaded both tensionally and torsionally in the absence of an applied load so as to produce a normally skewed relation therebetween that lies intermediate the coplanar and crossed positions thereof, said pre-loading of the bifilar acting through the bracket to pre-load that section of the torsion filament lying between the bracket and fixed support to a substantially greater extent than the remaining section of said torsion filament, said bifilar reacting in response to loads sensed by the movable support to turn the bracket from the null position it occupies in the absence of an applied load, and indicator means adapted to locate the null position of the bracket, the rotatable means being operable upon actuation to introduce torque into that section of the torsion filament connected thereto which is sufficient to counteract the deflection of the bracket caused by the applied load and return same to the null position evidenced by the indicator means.

2. The load-responsive system as set forth in claim 1 in which spring means are interposed in the torsion filament between the bracket and rotatable means, said spring means being adapted to transmit torque from said rotatable means to said torsion filament while maintaining substantially uniform tension in the latter across the entire range of applied loads the system is designed to measure.

3. The load-responsive system as set forth in claim 1 in which the relative tension loads in the sections of the torsion filament lying on opposite sides of the bracket are such that several complete turns of the rotatable means are required to produce a single revolution of the bracket under all loading conditions.

4. The load-responsive system as set forth in claim 2 in which the spring means is of the parallelogram-shaped leaf type.

5. The load-responsive system as set forth in claim 3 in which approximately seventy revolutions of the rotatable means are required to produce a single complete revolution of the bracket.

References Cited in the file of this patent

UNITED STATES PATENTS

| | | |
|---|---|---|
| 2,842,351 | Rodder | July 8, 1958 |
| 3,058,342 | Buck | Oct. 16, 1962 |

FOREIGN PATENTS

| | | |
|---|---|---|
| 178,789 | Great Britain | Apr. 18, 1922 |